United States Patent
Li et al.

(10) Patent No.: US 11,295,709 B2
(45) Date of Patent: Apr. 5, 2022

(54) METHOD FOR PROCESSING IMAGE DATA WITH REDUCED TRANSMISSION BANDWIDTH FOR DISPLAY

(71) Applicants: BEIJING BOE OPTOELECTRONICS TECHNOLOGY CO., LTD., Beijing (CN); BOE Technology Group Co., Ltd., Beijing (CN)

(72) Inventors: Yafei Li, Beijing (CN); Hsinchung Lo, Beijing (CN); Bo Gao, Beijing (CN); Wei Sun, Beijing (CN); Lingyun Shi, Beijing (CN); Hao Zhang, Beijing (CN); Ming Chen, Beijing (CN); Tiankuo Shi, Beijing (CN); Jinxing Liu, Beijing (CN); Wenjia Sun, Beijing (CN); Xue Dong, Beijing (CN)

(73) Assignees: BEIJING BOE OPTOELECTRONICS TECHNOLOGY CO., LTD., Beijing (CN); BOE Technology Group Co., Ltd., Beijing (CN)

(*) Notice: Subject to any disclaimer, the term of this patent is extended or adjusted under 35 U.S.C. 154(b) by 427 days.

(21) Appl. No.: 16/343,583

(22) PCT Filed: Jun. 4, 2018

(86) PCT No.: PCT/CN2018/089779
§ 371 (c)(1),
(2) Date: Apr. 19, 2019

(87) PCT Pub. No.: WO2019/232672
PCT Pub. Date: Dec. 12, 2019

(65) Prior Publication Data
US 2021/0335327 A1    Oct. 28, 2021

(51) Int. Cl.
| G09G 5/391 | (2006.01) |
| G06F 3/01 | (2006.01) |
| G06T 1/20 | (2006.01) |
| G06T 3/40 | (2006.01) |
| G09G 5/14 | (2006.01) |

(52) U.S. Cl.
CPC ............ *G09G 5/391* (2013.01); *G06F 3/013* (2013.01); *G06T 1/20* (2013.01); *G06T 3/40* (2013.01);
(Continued)

(58) Field of Classification Search
CPC .. G09G 5/391; G09G 5/14; G09G 2340/0407; G09G 2354/00; G06F 3/013; G06T 1/20; G06T 3/40
See application file for complete search history.

(56) References Cited

U.S. PATENT DOCUMENTS

| 8,184,069 B1 | 5/2012 | Rhodes |
| 2012/0146891 A1* | 6/2012 | Kalinli ................. H04N 19/115 345/156 |

(Continued)

FOREIGN PATENT DOCUMENTS

| CN | 101676982 A | 3/2010 |
| CN | 102074050 A | 5/2011 |

(Continued)

OTHER PUBLICATIONS

Vertex (Wikipedia, https://web.archive.org/web/20170721110911/https://en.wikipedia.org/wiki/Vertex_(geometry) Jul. 21, 2017). (Year:2017).*

(Continued)

*Primary Examiner* — Yu Chen
(74) *Attorney, Agent, or Firm* — Intellectual Valley Law, P.C.

(57) ABSTRACT

A method for processing image data with reduced transmission bandwidth is provided. The method includes receiving
(Continued)

a first set of data for image in a first resolution and receiving a center coordinate. The method further includes determining a high-definition region including an area and a boundary centered on the center coordinate. Additionally, the method includes rendering the first set of data based on the center coordinate and the area of the high-definition region to obtain a first subset of data. Furthermore, the method includes rendering a set of data compressed from the first set of data to obtain a second subset of data beyond the boundary. Moreover, the method includes transmitting a second set of image data to the display panel combining the first subset of data for display image in the first resolution and the second subset of data to display image in the second resolution.

17 Claims, 4 Drawing Sheets

(52) U.S. Cl.
CPC ........ *G09G 5/14* (2013.01); *G09G 2340/0407* (2013.01); *G09G 2354/00* (2013.01)

(56) References Cited

U.S. PATENT DOCUMENTS

| | | | |
|---|---|---|---|
| 2012/0147954 | A1 | 6/2012 | Kasai et al. |
| 2016/0260196 | A1 | 9/2016 | Roimela et al. |
| 2017/0084083 | A1 | 3/2017 | Wilson et al. |
| 2017/0236466 | A1* | 8/2017 | Spitzer ................. G09G 3/3275 345/560 |
| 2017/0332899 | A1* | 11/2017 | Walsh .................... A61B 3/154 |
| 2017/0344112 | A1 | 11/2017 | Wilson et al. |
| 2019/0295455 | A1* | 9/2019 | Goodson .......... H04N 21/64322 |

FOREIGN PATENT DOCUMENTS

| | | | |
|---|---|---|---|
| CN | 102474659 | A | 5/2012 |
| CN | 103559006 | A | 2/2014 |
| CN | 104268113 | A | 1/2015 |
| CN | 105939482 | A | 9/2016 |
| CN | 106131693 | A | 11/2016 |
| CN | 106162363 | A | 11/2016 |
| CN | 107450720 | A | 12/2017 |
| JP | 2011176570 | A | 9/2011 |

OTHER PUBLICATIONS

First Office Action in the Chinese Patent Application No. 201880000516.2, dated May 21, 2021; English translation attached.
Zhang S., "Gaze Assistant by Eye Tracking and Image Wrapping", 2010 Fifth International Conference on Frontier of Computer Science and Technology.
International Search Report & Written Opinion dated Feb. 20, 2019, regarding PCT/CN2018/089779.

\* cited by examiner

METHOD FOR PROCESSING IMAGE DATA WITH REDUCED TRANSMISSION BANDWIDTH FOR DISPLAY

CROSS-REFERENCE TO RELATED APPLICATION

This application is a national stage application under 35 U.S.C. § 371 of International Application No. PCT/CN2018/089779 filed Jun. 4, 2018, the contents of which are incorporated by reference in the entirety.

TECHNICAL FIELD

The present invention relates to display technology, more particularly, to a method of processing image data with reduced transmission bandwidth for transmitted for image display and a display apparatus.

BACKGROUND

As the development of virtual reality (VR) imaging technology, demands increase more and more on display apparatus with super high display resolution and super fast scanning rate for displaying digital images. Due to lack of bandwidth in transmitting huge amount of image data at interface between data generator and the displayer, displaying image with super high resolution based on large volume of image data some time cannot be achieved easily as the large volume of image data may not be effectively transmitted from a graphic processing unit (GPU) to the display panel to meet the demand of displaying a frame of image with super fast scanning rate, causing a tearing effect in the displayed image.

SUMMARY

In an aspect, the present disclosure provides a method for processing image data with reduced transmission bandwidth. The method includes receiving a first set of image data for image in a first resolution. The method further includes receiving a center coordinate corresponding to a viewer gaze point on a display panel. Additionally, the method includes determining a high-definition region centered on the center coordinate. The high-definition region includes an area and a boundary confined by apex coordinates relative to the center coordinate. Furthermore, the method includes rendering at least partially the first set of image data based on the center coordinate and the area of the high-definition region to obtain a first subset of data for image in the first resolution. The method further includes rendering a set of compressed data from the first set of image data based on the boundary of the high-definition region to obtain a second subset of data for image in a second resolution. The second resolution is a fraction of the first resolution. Moreover, the method includes transmitting a second set of image data combining the first subset of data for displaying image in the first resolution and the second subset of data for displaying image in the second resolution on the display panel.

Optionally, the first set of image data includes original image data sent to a graphic processing unit (GPU) to be applied for displaying an image on the display panel having N×M pixels in the first resolution, wherein N and M are integers.

Optionally, the first, subset of data includes L×L pixel data, wherein L is an integer being a first fraction of N and the first fraction is in a range of approximately ¼ to approximately ⅓.

Optionally, the second subset of data includes LAK pixel data. K is an integer being a second fraction of M and the second fraction is in a range of approximately ¼ to approximately ⅓.

Optionally, the method further includes sending the apex coordinates, prior to transmitting the second set of image data, from the GPU to an integrated circuit (IC) associated with the display panel for the IC to determine a location and a boundary of a first region having L×L pixels in the display panel using the first subset of data to display image in the first resolution and a second region beyond the boundary in the display panel using the second subset of data to display image in the second resolution.

Optionally, the step of transmitting the second set of image data includes writing the second subset of data from the GPU respectively to a set of addresses in a random-access memory (RAM) in the IC; reading the second subset of data from the RAM by the IC sequentially to transmit to the display panel as the RAM refreshes each of the set of addresses; sending the first subset of data from the GPU to the IC sequentially; and merging the first subset of data into the first region in the display panel.

Optionally, the set of addresses of the RAM is divided into a first group of addresses for storing a first part of the second subset of data corresponding to a section of the second region that share no row of pixels with the first region in the display panel and a second group of addresses for storing a second part of second subset of data corresponding to other sections of the second region that partially share L rows of pixels with the first region in the display panel.

Optionally, if a first row of pixels being a first row in the first region in the display panel is firstly scanned, the step of reading the second subset of data from the RAM includes reading each row of the second part of the second subset of data in the second resolution sequentially from the second group of addresses to a line buffer to transmit to the display panel with data per each pixel being scaled-up to a number of pixels in a corresponding row of the display panel including the first region, wherein the number of pixels is equal to N/L. The step of reading the second subset of data from the RAM further includes repeating the step of reading each row X times to transmit data of the each row to X sequential rows in the display panel, wherein the X is equal to M/K and is an integer. Furthermore, The step of reading the second subset of data from the RAM includes reading each row of the first part of the second subset of data sequentially from the first group of addresses to the line buffer to transmit data of the each row at a same time to a number of rows of pixels in the second region of the display panel without sharing common rows with the first region. The number of rows is equal to M/K.

Optionally, the step of merging the first subset of data includes replacing part of a row of the second subset of data scaled-up in the corresponding row of the first region in the display panel by a row of the L×L pixel data for displaying image in the first resolution.

Optionally, if one or more rows of pixels being in the second region in the display panel are firstly scanned before a first row of pixels in the first region is scanned, the step of reading the second subset of data from the RAM includes reading each of the one or more rows of the first part of the second subset of data sequentially from one or more addresses of the first group of addresses to a line buffer to transmit to corresponding one or more rows in the second region of the display panel with data per each pixel being scaled-up to a number of pixels in each corresponding row of the display panel. The number of pixels is equal to N/L. Additionally, the step of reading the second subset of data from the RAM includes refreshing each of the one or more addresses of the first group of addresses after reading the each of the one or more rows of the first part of the second subset of data. Furthermore, the step of reading the second subset of data from the RAM includes writing one row of the first subset of data into the each of the one or more addresses of the first group of addresses.

Optionally, the step of reading the second subset of data from the RAM further includes reading each row of the second part of the second subset of data sequentially from the second group of addresses to the line buffer to transmit to the display panel with data per each pixel being scaled-up to a number of pixels in the display panel starting from a corresponding row sharing the first row of pixels in the first region. The number of pixels is equal to N/L. Furthermore, the step of reading the second subset of data from the RAM includes replacing part of the second subset of data in the second resolution in the corresponding row of the display panel by retrieving the one row of the first subset of data just written in the a just-refreshed one of the one or more addresses of the first group of addresses. Moreover, the step of reading the second subset of data from the RAM includes repeating the step of reading each row X times to transmit data of the each row to X sequential rows in the display panel. The X is equal to M/K and is an integer.

Optionally, if at least one row of pixels exists in the second region in the display panel after a last row of pixels in the first region is scanned, the step of reading the second subset of data from the RAM further includes reading each of the at least one row of the first part of the second subset of data sequentially from at least one address of the first group of addresses to the line buffer to transmit to corresponding one of at least one row in the second region of the display panel with data per each pixel being scaled-up to a number of pixels in each corresponding one row of the display panel. The number of pixels is equal to N/L.

Optionally, a number of the one or more addresses of the first group of addresses includes one selected from 1 to a number of addresses in the first group of addresses.

In another aspect, the present disclosure provides a display apparatus including a display panel and a graphic processing unit (GPU) configured to receive a first set of image data and to process the first set of image data according to the method described herein to generate a second set of image data with reduced data-bandwidth and transmit the second set of image data via an integrated circuit (IC) to the display panel for displaying an image.

Optionally, the first set of image data includes a set of original data for the display panel to display a frame of image with N×M pixels in a first resolution. N and M are integers.

Optionally, the GPU is configured to receive the center coordinate and determine a high-definition region centered with the center coordinate having an area of L×L pixels in the first resolution in a boundary confined by apex coordinates related to the center coordinate. L is an integer being a fraction of N and the fraction is in a range of approximately ¼ to approximately ⅓.

Optionally, the GPU is configured to render at least partially the first set of image data based on the center coordinate and the area of the high-definition region to obtain a first subset of data for L×L pixels in the first resolution, to compress the first set of image data by a compression factor to a set of compressed data, and to render the set of compressed data based on the boundary of the high-definition region to obtain a second subset of data for L×K pixels in the second resolution. K is an integer being a fraction of M and the fraction is in a range of approximately ¼ to approximately ⅓. The compression factor is substantially equal to the fraction.

Optionally, the integrated circuit (IC) is configured to receive the apex coordinates and a second set of image data including the first subset of data and the second subset of data to determine locations of a first region in a part of the display panel to be assigned with the first subset of data to display image in the first resolution and a second region in remaining part of the display panel beyond a boundary of the first subset of data.

Optionally, the IC includes a random access memory (RAM) and a line buffer. The RAM includes a first group of addresses configured to store a first portion of the second subset of data corresponding to a part of the second region that shares common rows of pixels with the first region in the display panel and a second group of addresses configured to store remaining portion of the second subset of data corresponding to another part of the second region that does not share any common rows of pixels with the first region in the display panel.

Optionally, the IC is configured to transmit the second subset of data via the RAM to the display panel and scale up the second subset of data for L×K pixels to the N×M pixels, and to transmit the first subset of data to the L×L pixels of the first region to replace part of the second subset of data thereof, wherein the IC is configured to drive the display panel to display image in the first resolution in the first region using the first subset of data and display image in the second resolution in the second region using the scaled up second subset of data.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In the fovea region of the human eye, high-density cones are distributed and have the best visual acuity. As the density of the cones decreases from the center outwards to a certain angle, the ability to distinguish and perceive decreases accordingly. Therefore, in the process of screen display, human eye only is sensible to a center-concave field of view where a small high-definition (HD) region with high resolution is needed, while the surrounding area of the field of view can be rendered in a blurred manner without affecting a true visual effect to the human viewer. As the eyeball of the viewer turns, the fixation or gaze point changes dynamically across the display screen or display panel, thereby changing the above HD rendering area, centered with the fixation or gaze point. The actual test proves that when the central high-definition area is about 30° relative to the full screen display, the peripheral resolution beyond the central high-definition area can be reduced to approximately ¼ of the original high-definition resolution, hereinafter referred to as low-definition data, without affecting a good display effect. In this case, it is hardly for human eyes to distinguish display effect between a high-definition display and a low-definition display across the boundary of the central high-definition area.

One of conventional schemes uses data compression at the front-end, then outputs the data after being decompressed inside a driving integrated circuit (IC) of the displayer. Another conventional solution is to transmit low-resolution image data first to the IC in the front-end. After the IC performs a scaling-up operation, the output of the scaled-up image data is used for displaying the image on the displayer. Both options above have some negative effects on the quality of the image displayed.

Accordingly, the present disclosure provides, inter alia, a method of processing image data bandwidth and transmitting the processed image data with reduced data to a display panel, and a display apparatus having a graphic processing unit (GPU) and an integrated circuit (IC) configured to perform the image data processing and data transmission that substantially obviate one or more of the problems due to limitations and disadvantages of the related art.

Figure 1:
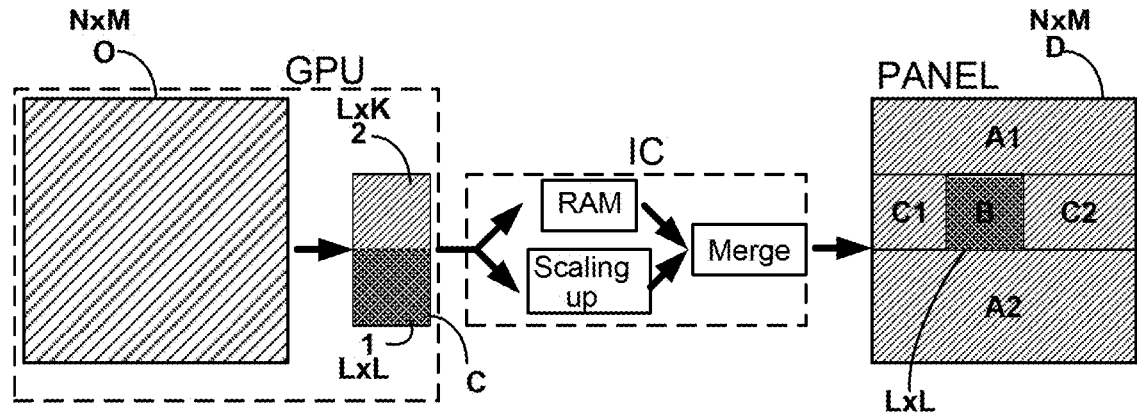
FIG. 1 is a schematic diagram illustrating a method of processing image data with reduced transmission bandwidth for displaying image effectively according to some embodiments of the present disclosure.

In one aspect, the present disclosure provides a method of processing image data with reduced transmission bandwidth according to some embodiments of the present disclosure. FIG. 1 shows a schematic diagram illustrating a method of processing image data with reduced transmission bandwidth for displaying image effectively according to some embodiments of the present disclosure. Referring to FIG. 1, a first set of image data O is provided for a display panel PANEL to display a frame of image with the first resolution to a viewer. Optionally, the display panel PANEL is designed to display an image with a first resolution based on N×M pixels in a certain panel area. Here N and M are integers depending on size of the panel. Optionally, the image displayed by the display panel PANEL with the first resolution is a high resolution image such as a high-definition image displayed via 4320×4800 pixels for a size of 3.5 inches. Optionally, the display panel PANEL can be one with even higher resolution as display technology continues to develop.

Accordingly, the first set of image data O can be represented as data assigned to N×M, N rows and M columns of pixels in the first resolution. Conventionally, the first set of image data O is directly transmitted through an integrated circuit (IC) associated with the display panel to a driver to convert each digital data to a voltage signal or a current signal to generate a light signal out of each pixel of the N×M pixels to display a frame of image in the first resolution. This requires the IC to handle total N×M data per frame and scan each row of M pixels for all N rows during a smart view operation. When scanning rate is also set high, such as 240 Hz or higher, the data bandwidth of a driver chip for handling these image data becomes increasingly high, driving the cost much higher. Alternative way to handle the large volume of image data without pushing higher bandwidth for the driver chip is desired and presented in this disclosure.

In the embodiments, referring to FIG. 1, the first set of image data O including N×M pixel data is firstly sent to a graphic processing unit (GPU). Optionally, the GPU includes a memory device to store the N×M pixel data designed for displaying one frame of image on a display panel having N×M pixels in the first resolution. The GPU is configured to receive information about a center coordinate of a viewer's fixation or gaze point on the display panel. In general, the fixation or gaze point of a viewer represents a center point of a projected center-concave field of view on a screen or display panel of a human eye fovea region with high-density cones. As the density of the cones decreases from the center outwards to a certain angle, the ability to distinguish and perceive decreases accordingly. Therefore, the projected field of view is an area that is sensible to human eye regarding the image resolution. Beyond a boundary of this area the image data can be rendered in a blurred manner without affecting a true visual effect to the human viewer. In other words, the projected field of view centered with the gaze point corresponds to a high-definition region where high or low image resolution can be distinguished, while other region beyond the high-definition region can be a low-definition region. Optionally, collecting the information of the center coordinate of the gaze point is performed using sensors which are able to dynamically detect the change of any viewer in an arbitrary position in front of the display panel.

In some embodiments, the GPU is configured to determine a high-definition region centered on the center coordinate corresponding to a viewer's gaze point on the display panel. The high-definition region shall be a fraction of a field of view area in the display panel. Depending on a distance of the viewer to the display panel and the size of the display panel, the field of view area may be part of or the whole area of the display panel determined by approximately ⅓ of human viewing angle. Optionally, for the convenience of description in this disclosure, the field of view area of the display panel is represented by N×M pixels in the first resolution and the high-definition region is represented by L×K pixels in the first resolution, where L and K are integers and L is a fraction of N and K is the fraction of M. The fraction can be in a range of approximately ¼ to approximately ⅓. Optionally, the high-definition region is a theoretical region with a fixed area and a boundary determined by (typically 4) apex coordinates no matter where the gaze point moves on the display panel dynamically. The change of the gaze point on the display panel may change actual number of physical pixels of the high-definition region in the display panel. For example, the number of pixels may be less when the gaze point is falling to an edge point comparing to that when the gaze point is falling to a central point in the display panel. But these variations should not affect the claims herein based on the method of processing image data with reduced transmission bandwidth.

Referring to FIG. 1, the GPU is configured to render the first set of image data O at least partially based on the center coordinate and the area of the high-definition region to obtain a first subset of data 1 for displaying image in the first resolution. This high-definition region, in an example, corresponds to a visual sensitive region in part of a whole displayed image. The size and shape of this high-definition region is depended on specific optical viewing system as well as the layout of a plurality of image pixels in the display panel. Optionally, the first subset of data 1 includes L×L pixel data, i.e., the high-definition region is a square shape, where L is an integer being the fraction of N. Optionally, L×L original data out of the first set of image data O corresponding to the same L×L pixels in the high-definition region are used by the GPU in the rendering process. Optionally, the first subset of data 1 includes L×L' pixel data and L≠L', i.e., the high-definition region is a rectangular shape. Optionally, additional number of data of the first set of image data O corresponding to regions near boundary of the high-definition region may be also used by the GPU in the rendering process. Optionally, the first subset of data 1 obtained by the rendering process retains substantially the same application for displaying image in a high resolution as those of the first set of image data O.

In some embodiments, the GPU is also configured to perform a data compression so that the first set of image data O is compressed to a set of compressed data. In a particular example, the first set of image data O comprises N×M pixel data and the set of compressed data includes L×K pixel data such that each compressed pixel data is obtained through a compression factor from corresponding multiple of the first set of image data O. Here, the compression factor can be set to equal to L/N or K/M. Detail schemes of the data compression may vary, yet not alter the scope of claims herein. Additionally in some embodiments, the GPU is further configured to render the set of compressed data at least partially based on the boundary of the high-definition region to obtain a second subset of data 2 to be assigned to L×K pixels. Optionally, the second subset of data 2 is used for displaying image in a second resolution. Optionally, the second resolution is a fraction of the first resolution. Optionally, the second resolution is ¼ of the first resolution.

Referring to FIG. 1, the GPU is configured to combine the first subset of data 1 with the second subset of data 2 to obtain a second set of image data C. Optionally, the second set of image data includes L×(K+L) pixel data, substantially less in volume than the first set of image data of N×M pixel data. In an example, the original set of data for 4320×4800 pixels can be reduced to 1440×2640 pixels, reducing the data volume to ⅕. As the GPU transmitted the second set of image data for the display panel to display image, data bandwidth has been substantially reduced, thereby enhancing operability of the display apparatus. In the embodiment, the second set of image data C is firstly transferred from the GPU to an integrated circuit (IC) configured to drive the display panel PANEL for displaying image. With the reduced data bandwidth of the image data, the driving chip inside the IC can easily handle these data without upgrading chip transmission rate. Optionally, the display panel PANEL is operated to display each frame of image based on smart view progressive lines scan scheme. Optionally, the display panel PANEL is operated to display the image by allowing multiple rows of data to be delivered to the display panel at the same time (i.e., not through progressive lines scan scheme).

Referring to FIG. 1, the IC includes at least a random access memory (RAM), a first control mechanism for scaling up data, and a second control mechanism for merging data. In an embodiment, the IC is configured to process the second set of image data C sent from the GPU. Prior to any data processing operation, the IC is configured to receive center coordinate and apex coordinates about the high-definition region, based on which the IC can determine a location and a boundary of a first region projected to the display panel and a second region in the display panel beyond the boundary. A first data processing operation is to save at least partially the second set of image data C to the RAM. Optionally, primarily the second subset of data 2 is written and read respectively into the RAM via a first-in-first-out scheme. Optionally, one at a time, an address of the RAM can be refreshed after reading to clear the data written inside and allow a new data to be written into the address again. Optionally, the first subset of data 1 can be written row to row sequentially into the one just-refreshed address and later be retrieved and transmitted. In another embodiment, the IC is configured to perform a data scaling up process for at least part of the incoming data. In particular, the second subset of data, which is designed for displaying image in the second (or lower) resolution, can be scaled up to match the number of pixels with the physical pixels in the display panel so that the lateral resolution of these data is consistent with the resolution provided to the display panel. In yet another embodiment, the IC is configured to perform a data merging process to at least part of the incoming data. In particular, the first subset of data 1 sent from the GPU, depending on embodiments, can be directly merged with part of the scaled-up second subset of data 1 in the first region of the display panel by replacing the data thereof by the first subset of data for displaying image in the first resolution. While, in the remaining part of the second region of the display panel, where the scaled-up second subset of data have been loaded, the image can be displayed in the second resolution.

Referring to FIG. 1, after all the data writing/reading, scaling up, and merging operations in the IC, the IC can transmit the processed data to the display panel PANEL. Effectively, N×M pixels of the display panel PANEL will receive the data scaled up from the second subset of data 2 for L×K pixels. Then in the first region B within the display panel PANEL, the scaled-up second subset of data thereof are replaced by the first subset of data 1 for L×L pixels. Therefore, the display panel PANEL is to use the first subset of data to display image in the first resolution in the first region B and use the scaled up second subset of data to display image in the second resolution in the second region including sections A1, A2, C1, and C2. Optionally, the first region B may be located at the top edge with the first row of the first region B is also part of the first row of the display panel being scanned. Optionally, the first region B may be located in near a middle part of the display panel such that one or more rows of the display panel being firstly scanned belong to a section of the second region that does not share common rows with the first region B. Optionally, the first region B may be located at bottom edge with the last row of the first region B is also part of the last row of the display panel. Of course, the "top" or "bottom" is merely terms for description convenience by referring to figures shown in this disclosure and should not limit the scope of claims herein.

Figure 2:
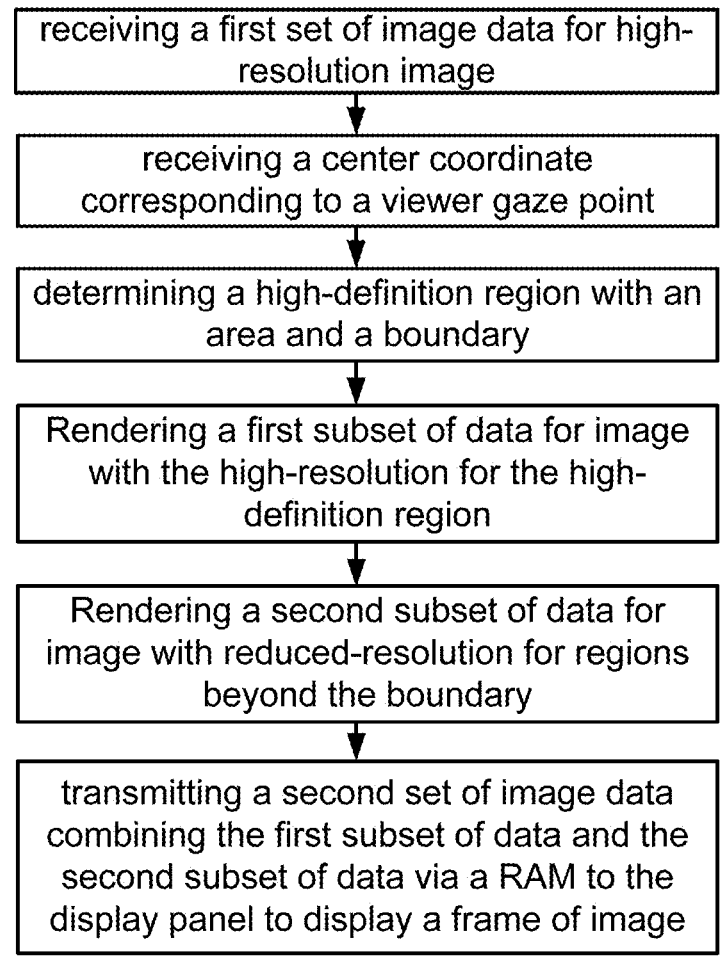
FIG. 2 is a flow chart illustrating a method of processing image data with reduced transmission bandwidth according to some embodiments of the present disclosure.

FIG. 2 is a flow chart illustrating a method of processing image data with reduced transmission bandwidth according to some embodiments of the present disclosure. Referring to FIG. 2 and FIG. 1, the method of processing image data includes receiving a first set of image data for displaying image with a high resolution. Optionally, the first set of image data is for a high-definition display panel to display a frame of image in a first resolution. Optionally, the first resolution corresponds to an array of 4320×4800 pixels per 3.5 inches of display panel. Optionally, the first resolution of a panel with N×M pixels configured with an arbitrary number of pixel density higher than 4320×4800 pixels per 3.5 inches.

Referring to FIG. 2, the method further includes receiving a center coordinate corresponding to a viewer gaze point. In principle, the viewer gaze point is dynamically detected by one or more sensors associated with a display apparatus or system containing the GPU and the display panel (FIG. 1). Optionally, the GPU that receives the center coordinate about the viewer gaze point is also configured to define several apex coordinates based on a predetermined view angle and an area within a boundary confined by the apex coordinates.

Referring to FIG. 2 again, the method includes determining a high-definition region based on the area and the boundary confined by the apex coordinates if the predetermined view angle is selected to be about 33° or ⅓ of total ~100° of human view angle. The high-definition region corresponds to an image resolution sensible region to human eyes. For example, for a 3.5 inches panel having 4320×4800 pixels, the high-definition region sensible to human eye is about ⅓ of that, i.e., 1440×1440 pixels.

Additionally, the method of processing image data includes rendering a first subset of data for image with the high-resolution for the high-definition region. Optionally, the rendering process is performed in the GPU and includes multiple data analysis on at least part of the first set of image data O originally received by the GPU based on the center coordinate and the area of the high-definition region. The rendering process is to obtain the first subset of data 1 used to display an image in a first resolution for the high-definition region. The first resolution is effectively comparable to an original image with substantially the same high resolution using the first set of image data O displayed in a same sized region within the display panel.

In the embodiment, the method further includes rendering a second subset of data for image with reduced-resolution for regions beyond the boundary. Optionally, the rendering process is performed in the GPU and includes multiple data analysis on at least part of the first set of image data O originally received by the GPU based on the area and the boundary of the high-definition region to determine a second subset of data 2. Optionally, the GPU is configured to firstly compress the first set of image data to a set of compressed data and to further render the set of compressed data to obtain the second subset of data 2. Optionally, the second subset of data 2 is used to generate image data for displaying image(s) in a second resolution in regions beyond the high-definition region within the display panel. Optionally, the second resolution is a fraction of the first resolution. For example, the second resolution is ¼ of the first resolution.

Moreover, the method of processing image data includes transmitting a second set of image data combining the first subset of data and the second subset of data via a RAM to the display panel to display a frame of image. Optionally, the first subset of data 1 and the second subset of data 2 is transmitted firstly from the GPU to an integrated circuit (IC) associated with the display panel. The IC includes at least a RAM, referring to FIG. 1. The RAM is configured to save the second subset of data 2 and allow data being retrieved via a first-in-first-out scheme. The retrieved data can be scaled up to match later resolution of the original first set of image data for displaying image on the display panel before transmitted the scaled-up data to the display panel for displaying image in the reduced resolution. Further, the first subset of data 1 can be merged into a first region in the display panel corresponding to the high-definition region to replace the data there for displaying image in the high resolution in the first region. Fundamentally, each of the first subset of data 1 and the second subset of data 2 includes much reduced data volume compared to the original first set of image data. In an example, the second set of image data is only ⅕ of original first set of image data. The reduced data bandwidth of image data allows a driving integrated circuit for the display panel to easily transmit these processed image data in high transmission rate for displaying image without sacrificing image quality to viewer.

Figure 3:
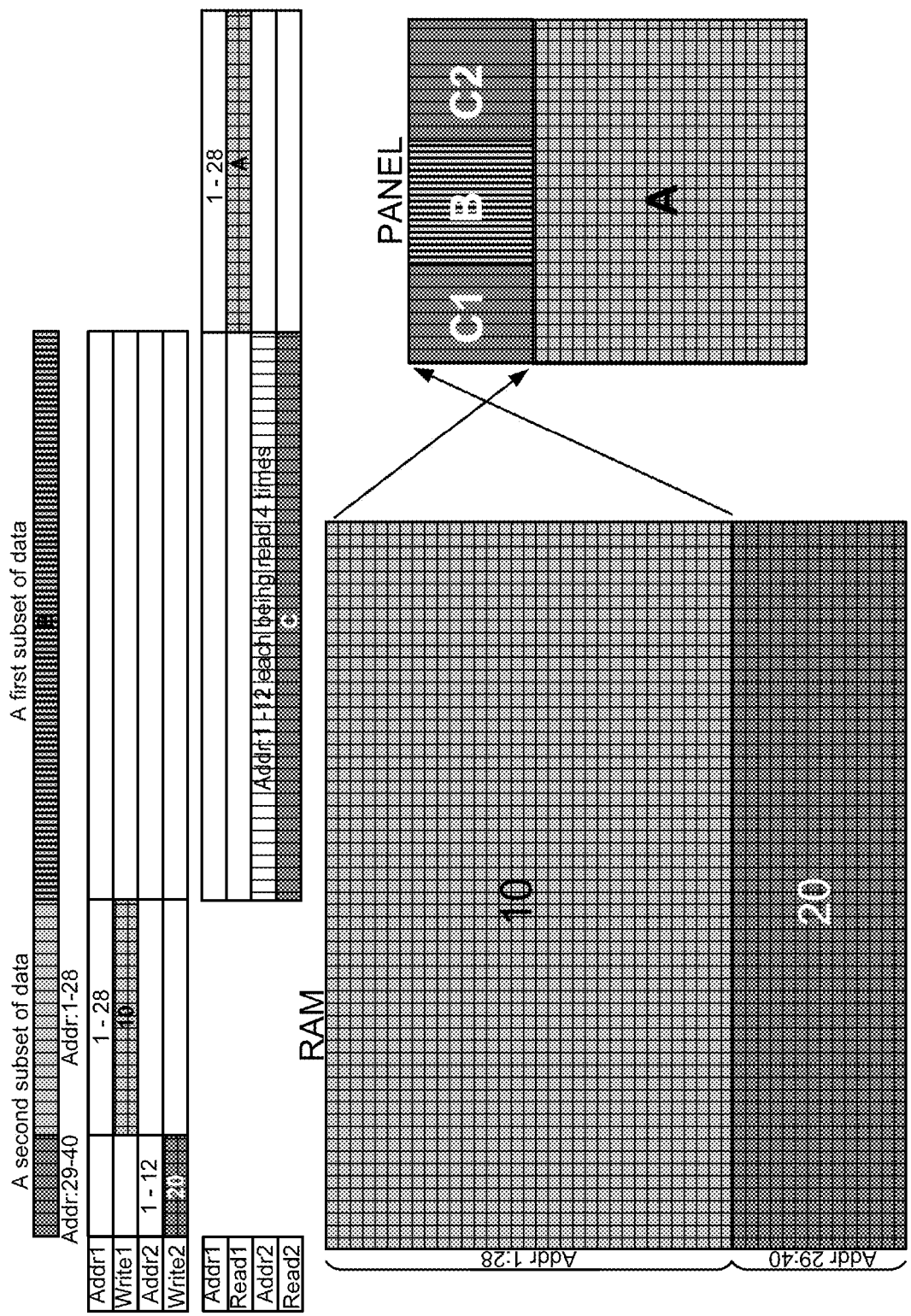
FIG. 3 is a schematic diagram showing an example of transmitting image data with reduced transmission bandwidth for displaying image on a display panel according to an embodiment of the disclosure.

In some embodiments, the transmitting of the second set of image data with reduced transmission bandwidth to the display panel is performed by the IC via the RAM configured with a first-in-first-out data writing/reading scheme. FIG. 3 is a schematic diagram showing an example of transmitting image data with reduced transmission bandwidth for displaying image on a display panel according to an embodiment of the disclosure. Referring to FIG. 3, in an embodiment, the second subset of data 2 is provided for L×K pixels, where L and K are integers and L is a fraction of N and K is the fraction of M corresponding to original first set of image data provided for N–M pixels. In an example, L×K pixels include 1440×1200 pixels. In the embodiment, the RAM is configured to save a certain amount of data based on a fixed ratio of its storage capacity over the data capacity. Optionally, the fixed ratio is 1/30. Here, for supporting 1440×1200 pixel data, the RAM storage capacity is divided to 40 addresses: Addr.1 to Addr.40, with each address having a capacity of 48 units. Each address is able to store one or more (up to 36) rows of 1200 pixel data per row.

For facilitating smart view display at the display panel having the first region B configured to display image in high resolution which shares common rows with one or more sections (C1, C2) of the second region configured to display image in low resolution and not sharing any common rows with one or more additional sections (A1, A2) of the second region configured to display image in low resolution, the RAM is divided into two portions. The first portion 10 includes a first group of addresses, Addr. 1 to Addr. 28. The second portion 20 includes a second group of addresses, Addr. 29 to Addr. 40. Since the first region B corresponding to the high-definition region is moving as long as the viewer gaze point moves across the display panel, the first region B may be located at one edge (top) of the display panel (see FIG. 3), or near middle of the display panel (see FIG. 4 below), or at an opposite edge (bottom) of the display panel (see FIG. 5 below). For different cases above, the scheme of data writing/reading in/out of the RAM used by the IC to handle the second subset of data 2 is slightly different. Detail descriptions are given below based on three examples respectively shown in FIG. 3, FIG. 4, and FIG. 5.

Referring to FIG. 3, the first region B corresponding to the high-definition region is located at top edge of the display panel. Every row of pixels in sections C1 and C2 of the second region partially shares a corresponding row in the first region B. In the example, a part of the second subset of data is sequentially stored in the second portion 20 of the RAM with the second group of addresses Addr. 29~40. A remaining part of the second subset of data 2 is sequentially stored in the first portion 10 of the RAM with the first group of addresses Addr. 1~28. After writing the data into the RAM as shown above, the IC controls a reading process to retrieve data and refresh corresponding address sequentially row-by-row before transmitting each row of the retrieved data to a corresponding row in the sections C1 and C2 of the second region and the first region B. In particular, the data in the first row of the panel is stored in Addr. 29, the first row of second subset of data 2 is firstly read from the Addr. 29 and is sent to a line buffer. The IC is configured to perform horizontal scaling up to expand the row of second subset of data to the whole row of physical pixels of the display panel. Each data is distributed to a number of pixels in the same row. For example, the number of pixels is 3; i.e., total 1200 pixel data are scaled up to 4800 pixels of the display panel. After the scaling up, a first row of the first subset of data, i.e., a first row of 1200 pixel data, is sent from the GPU and merged into the first row of the first region B to replace those scaled-up second subset of data loaded thereof. Now the first row of pixels in the display panel is assigned with the scaled-up second subset of data read from Addr. 29 in the sections C1 and C2 but with the first row of the first subset of data in the first region B.

For performing smart view line scan, the Addr. 29 will be repeatedly read total X times from the second group of addresses in the second portion 20 of the RAM to achieve a vertical scaling up of each of the 1200 pixel data, where X equals to M/K=4. In other words, the pixel data in the first 4 rows of the display panel in section C1 and section C2 are the same. But for every one of the first 4 rows in the first region B, a new row of first subset of data that is sent from the GPU is merged therein. After that, the data stored in the Addr. 30 are read to the line buffer, scaled up horizontally by factor of 3 (i.e., one pixel expanded to 3 pixels), and distributed to the fifth row of the display panel. Again the reading of the data from the Addr 30 will take places 4 times (for vertical scaling up). Every time, one corresponding row of first subset of data will be merged to the corresponding row of pixels in the first region B between the sections C1 and C2. This series of operations are continued until last row of the part of the second subset of data stored in the Addr. 40, the last address in the second group of addresses, are read, scaled up, and distributed in the display panel to display images in sections C1 and C2 in the second (low) resolution while an image in the first region B in the first (high) resolution.

Next, the IC is configured to read every row of the remaining part of the second subset of data stored in the first portion 10 of the RAM with the first group of addresses, Addr. 1~28, to retrieve, scaled up horizontally, and distributed to a corresponding row of pixels in the section A of the second region. When smart view display control is enabled, the driver circuit of the display panel can open up 4 gate lines to load 4 rows of scaled-up second subset of data to 4 rows of pixels in the section A of the second region for displaying image in the second (low) resolution. If the smart view display control is not enabled, each row of the second subset of data read from the first group of addresses can be simple copied 4 times for 4 sequential rows to achieve the vertical scaling up.

Figure 4:
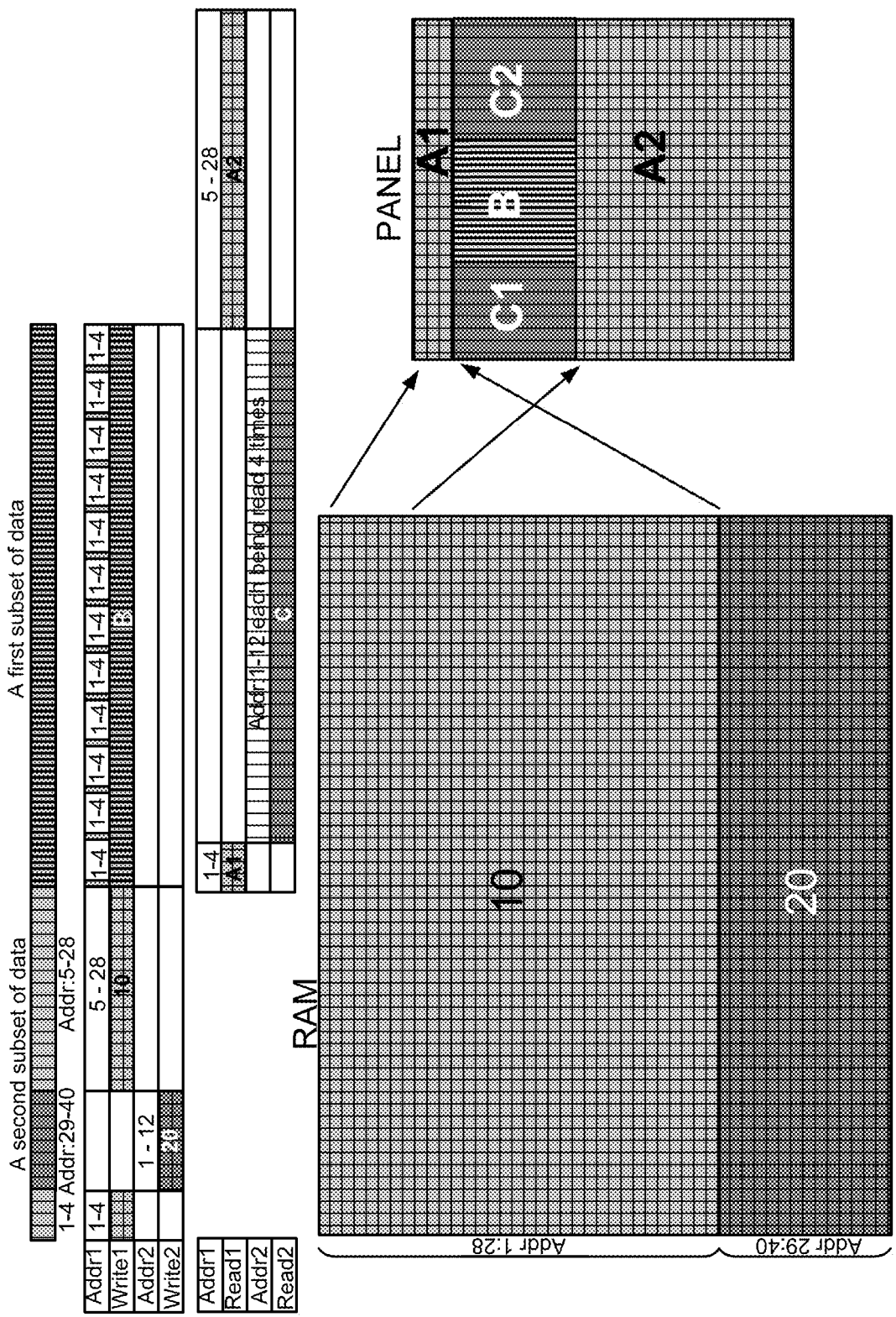
FIG. 4 is a schematic diagram showing another example of transmitting image data with reduced transmission bandwidth for displaying image on a display panel according to an embodiment of the disclosure.

FIG. 4 is a schematic diagram showing another example of transmitting image data with reduced transmission bandwidth for displaying image on a display panel according to an embodiment of the disclosure. Referring to FIG. 4, the first region B is determined by the IC to be located around a middle portion of the display panel. The first one or more rows of pixels of the display panel that are firstly scanned during the operation of smart view line scan belong to a section A1 of the second region that shares no common rows with the first region B. Again, part of the second subset of data corresponding to the sections C1 and C2 that share common rows with the first region B are saved in the second portion 20 of the RAM with the second group of addresses Addr. 29~40 and the remaining part of the second subset of data are saved sequentially in the first portion 10 of the RAM with the first group of addresses Addr. 1~28. After writing these data respectively into the RAM, data for the first one or more rows that are firstly scanned are sequentially read from the corresponding one or more addresses in the first group of addresses (for example, Addr. 1~4) to the line buffer. Then, scaling up the retrieved second subset of data horizontally for each pixel data is followed. Optionally, scaling up the data horizontally is to expand each pixel data to three neighboring pixels in the same row. For every row of the retrieved second subset of data, the IC is configured to drive a gate-on-array circuit to open M/K=4 lines at a same time to realize the smart view display progressively. Because there is no first region B in the section A1 (see FIG. 4), the first subset of data sent from the GPU at this time will be written into to each address among the one or more of the first group of addresses that is just refreshed after the retrieving of the first row of second subset of data thereof. For example, a row of second subset of data is read firstly from Addr. 1, then the Addr. 1 is refreshed. A first row of first subset of data is saved to the refreshed Addr. 1 while the first row of the second subset of data is copied 4 times to allow the IC to deliver at the same time to four consecutive rows in section A1.

When all the one or more rows of pixels in the section A1 of the display panel are finished scans, a next row of pixels is one shared by section C1, C2 of the second region and the first region B. The corresponding data for this row is saved in the Addr. 29 in the second group of addresses. After reading it from the Addr. 29 to the line buffer, the row of second subset of data is again scaled up 3 times horizontally. Then, the first row of the first subset of data can be retrieved from the Addr. 1 and is merged to the current row to replace data in corresponding pixels thereof belong to the first region B. Similar to the description earlier for FIG. 3, from the first row to last row of the first region, the first subset of data is refreshed row by row via the one or more addresses of the first group of addresses and the second subset of data to be scaled up and assigned to the pixels in section C1 and section C2 of the second region need to be read 4 times per row sequentially from Addr. 29~40 to achieve the vertical scaling up. These scaled-up second subset of data are merged with the first subset of data retrieved from the one or more addresses in the first group of addresses (mentioned earlier) before being sent to the display panel for displaying an image with high resolution in the first region B while images with low resolution in section C1 and section C2 of the second region.

Next, if there is another section A2 of the second region after the last row of the first region B in the display panel, the IC is configured to perform the similar operation as that for section A1 of the second region till the last row of pixels is assigned a row of scaled-up second subset of data.

Figure 5:
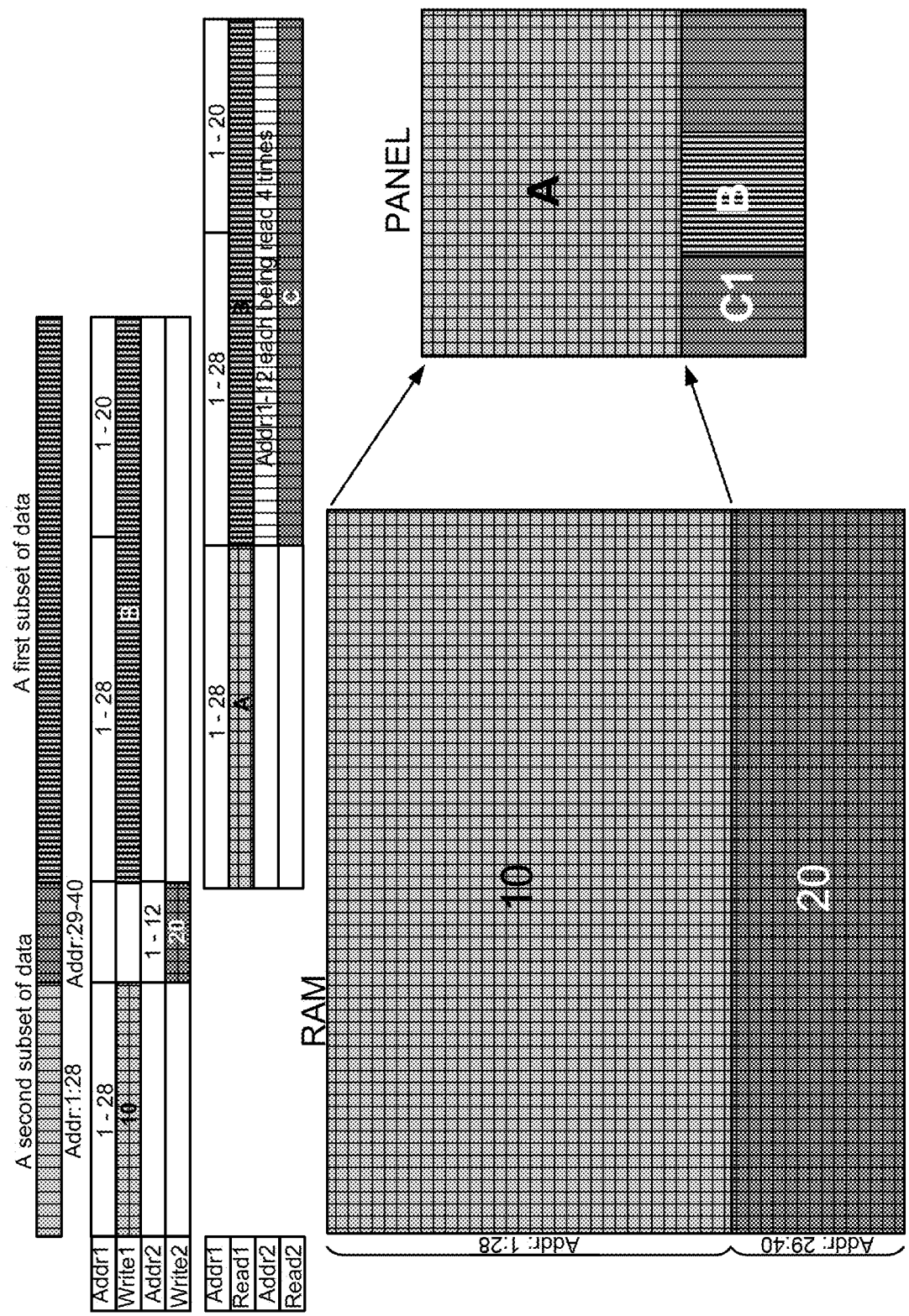
FIG. 5 is a schematic diagram showing yet another example of transmitting image data with reduced transmission bandwidth for displaying image on a display panel according to an embodiment of the disclosure.

FIG. 5 is a schematic diagram showing yet another example of transmitting image data with reduced transmission bandwidth for displaying image on a display panel according to an embodiment of the disclosure according to an embodiment of the present disclosure. In some embodiments, FIG. 5 is a special situation of the FIG. 4. In FIG. 5, the first region B is located to the bottom edge of the display panel. There is no section A2 with any row of pixels after the last row of the first region B (including last row of section C1 and section C2 of the second region). The section A1 of FIG. 4 becomes the second A of FIG. 5. Therefore, the major operations performed by the IC are to handle the incoming second set of image data including a first subset of data and a second subset of data via a RAM. The first subset of data is used to be assigned to the pixels in the first region in the display panel for displaying image with the first (high) resolution. The second subset of data is divided to two parts, the first part corresponding to part of the second region of the display panel that is not sharing any common row with the first region and the second part corresponding to remaining part of second region that shares common rows with the first region. The first part of the second subset of data is saved in a first portion of the RAM with a first group of addresses and the second part of the second subset of data is saved in a second portion of the RAM with a second group of addresses. Finally, the IC is able to deliver the scaled-up second subset of data to the second region and the first subset of data to the first region to display a frame of image including high resolution in the first region and low resolution in the second region yet providing substantially the same visual effect to viewer.

In another aspect, the present disclosure provides a display apparatus including display panel and a graphic processing unit (GPU) configured to receive a first set of image data and to process the first set of image data according to the method described herein. The GPU is configured to generate a second set of image data with reduced data-bandwidth and transmit the second set of image data via an integrated circuit (IC) to the display panel for displaying an image.

Referring to FIG. 1, the first set of image data received by the GPU includes a set of original data for the display panel to display a frame of image with N×M pixels in a first resolution. N and M are integers. The GPU is configured to receive the center coordinate and determine a high-definition region centered with the center coordinate having an area of L×L pixels in the first resolution in a boundary confined by apex coordinates related to the center coordinate. L is an integer being a fraction of N and the fraction is in a range of approximately ¼ to approximately ⅓.

Referring to FIG. 1, the GPU is configured to render at least partially the first set of image data based on the center coordinate and the area of the high-definition region to obtain a first subset of data for L×L pixels in the first resolution. The GPU is also configured to compress the first set of image data by a compression factor to a set of compressed data. The GPU is further configured to render the set of compressed data based on the boundary of the high-definition region to obtain a second subset of data for L×K pixels in the second resolution. K is an integer being a fraction of M and the fraction is in a range of approximately ¼ to approximately ⅓, and the compression factor is substantially equal to the fraction.

Additionally, in the display apparatus, the integrated circuit (IC) is configured to receive the apex coordinates from the GPU and a second set of image data including the first subset of data and the second subset of data to determine locations of a first region in a part of the display panel to be assigned with the first subset of data to display image in the first resolution and a second region in remaining part of the display panel beyond a boundary of the first subset of data.

Furthermore, the IC includes a random access memory (RAM) and a line buffer. The RAM includes a first group of addresses configured to store a first portion of the second subset of data corresponding to a part of the second region that shares common rows of pixels with the first region in the display panel and a second group of addresses configured to store remaining portion of the second subset of data corresponding to another part of the second region that does not share any common rows of pixels with the first region in the display panel.

Moreover, the IC is configured to transmit the second subset of data via the RAM to the display panel and scale up the second subset of data for L×K pixels to the N×M pixels. The IC is further configured to transmit the first subset of data to the L×L pixels of the first region to replace part of the second subset of data thereof. The IC is configured to drive the display panel to display image in the first resolution in the first region using the first subset of data and display image in the second resolution in the second region using the scaled up second subset of data.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for processing image data with reduced transmission bandwidth comprising:

receiving a first set of image data for image in a first resolution;

receiving a center coordinate corresponding to a viewer gaze point on a display panel;

determining a high-definition region centered on the center coordinate;

rendering at least partially the first set of image data based on the center coordinate and the area of the high-definition region to obtain a first subset of data for image in the first resolution;

rendering a set of compressed data from the first set of image data based on a boundary of the high-definition region to obtain a second subset of data for image in a second resolution, wherein the second resolution is a fraction of the first resolution; and transmitting a second set of image data combining the first subset of data for displaying image in the first resolution and the second subset of data for displaying image in the second resolution on the display panel;

wherein the transmitting of the second set of image data comprises:

writing the second subset of data from the GPU respectively to a set of addresses in a random-access memory (RAM) in the IC;

reading the second subset of data from the RAM by the IC sequentially to transmit to the display panel as the RAM refreshes each of the set of addresses;

sending the first subset of data from the GPU to the IC sequentially; and merging the first subset of data into the first region in the display panel;

wherein the set of addresses of the RAM is divided into a first group of addresses for storing a first part of the second subset of data corresponding to a section of the second region that share no row of pixels with the first region in the display panel and a second group of addresses for storing a second part of second subset of data corresponding to other sections of the second region that partially share rows of pixels with the first region;

wherein the reading of the second subset of data from the RAM, if a first row of pixels being a first row in the first region in the display panel is firstly scanned, comprises:

reading each row of the second part of the second subset of data in the second resolution sequentially from the second group of addresses to a line buffer to transmit to the display panel with data per each pixel being scaled-up to a number of pixels in a corresponding row of the display panel including the first region;

repeating the reading each row X times to transmit data of the each row to X sequential rows in the display panel; and reading each row of the first part of the second subset of data sequentially from the first group of addresses to the line buffer to transmit data of the each row at a same time to a number of rows of pixels in the second region of the display panel without sharing common rows with the first region.

2. The method of claim 1, wherein the first set of image data comprises original image data sent to a graphic processing unit (GPU) to be applied for displaying an image on the display panel having N×M pixels in the first resolution, wherein N and M are integers.

3. The method of claim 2, wherein the first subset of data comprises L×L pixel data, wherein L is an integer being a first fraction of N and the first fraction is in a range of ¼ to ⅓.

4. The method of claim 3, wherein the second subset of data comprises L×K pixel data, wherein K is an integer being a second fraction of M and the second fraction is in a range of ¼ to ⅓.

5. The method of claim 4, further comprising determining a location and a boundary of a first region having L×L pixels in the display panel using the first subset of data to display image in the first resolution and a second region beyond the boundary of the first region in the display panel using the second subset of data to display image in the second resolution.

6. The method of claim 1, wherein the number of pixels is equal to N/L; and wherein the number of rows is equal to M/K.

7. The method of claim 6, wherein the merging of the first subset of data comprises replacing part of a row of the second subset of data scaled-up in the corresponding row of the first region in the display panel by a row of the L×L pixel data for displaying image in the first resolution.

8. The method of claim 1, wherein the reading of the second subset of data from the RAM, if one or more rows of pixels being in the second region in the display panel are firstly scanned before a first row of pixels in the first region is scanned, comprises:

reading each of the one or more rows of the first part of the second subset of data sequentially from one or more addresses of the first group of addresses to a line buffer to transmit to corresponding one or more rows in the second region of the display panel with data per each pixel being scaled-up to a number of pixels in each corresponding row of the display panel, wherein the number of pixels is equal to N/L;

refreshing each of the one or more addresses of the first group of addresses after reading the each of the one or more rows of the first part of the second subset of data; and writing one row of the first subset of data into the each of the one or more addresses of the first group of addresses.

9. The method of claim 8, further comprising:

reading each row of the second part of the second subset of data sequentially from the second group of addresses to the line buffer to transmit to the display panel with data per each pixel being scaled-up to a number of pixels in the display panel starting from a corresponding row sharing the first row of pixels in the first region, wherein the number of pixels is equal to N/L;

replacing part of the second subset of data in the second resolution in the corresponding row of the display panel by retrieving the one row of the first subset of data just written in a just-refreshed one of the one or more addresses of the first group of addresses; and repeating the reading each row X times to transmit data of the each row to X sequential rows in the display panel, wherein the X is equal to M/K.

10. The method of claim 9, if at least one row of pixels exists in the second region in the display panel after a last row of pixels in the first region is scanned, further comprising:

reading each of the at least one row of the first part of the second subset of data sequentially from at least one address of the first group of addresses to the line buffer to transmit to corresponding one of at least one row in the second region of the display panel with data per each pixel being scaled-up to a number of pixels in each corresponding one row of the display panel, wherein the number of pixels is equal to N/L.

11. The method of claim 8, wherein a number of the one or more addresses of the first group of addresses comprise one selected from 1 to a number of addresses in the first group of addresses.

12. A display apparatus comprising a display panel and a graphic processing unit (GPU) configured to receive a first set of image data and to process the first set of image data according to a method to generate a second set of image data with reduced data-bandwidth and transmit the second set of image data via an integrated circuit (IC) to the display panel for displaying an image, the method comprising:

receiving a first set of image data for image in a first resolution;

receiving a center coordinate corresponding to a viewer gaze point on a display panel;

determining a high-definition region centered on the center coordinate;

rendering at least partially the first set of image data based on the center coordinate and the area of the high-definition region to obtain a first subset of data for image in the first resolution;

rendering a set of compressed data from the first set of image data based on a boundary of the high-definition region to obtain a second subset of data for image in a second resolution, wherein the second resolution is a fraction of the first resolution; and transmitting a second set of image data combining the first subset of data for displaying image in the first resolution and the second subset of data for displaying image in the second resolution on the display panel;

wherein the transmitting of the second set of image data comprises:

writing the second subset of data from the GPU respectively to a set of addresses in a random-access memory (RAM) in the IC;

reading the second subset of data from the RAM by the IC sequentially to transmit to the display panel as the RAM refreshes each of the set of addresses;

sending the first subset of data from the GPU to the IC sequentially; and merging the first subset of data into the first region in the display panel;

wherein the IC comprises a random access memory (RAM) and a line buffer, wherein the RAM comprises a first group of addresses configured to store a first portion of the second subset of data corresponding to a part of the second region that shares common rows of pixels with the first region in the display panel and a second group of addresses configured to store remaining portion of the second subset of data corresponding to another part of the second region that does not share any common rows of pixels with the first region in the display panel;

wherein the reading of the second subset of data from the RAM, if a first row of pixels being a first row in the first region in the display panel is firstly scanned, comprises:

reading each row of the second part of the second subset of data in the second resolution sequentially from the second group of addresses to a line buffer to transmit to the display panel with data per each pixel being scaled-up to a number of pixels in a corresponding row of the display panel including the first region;

repeating the reading each row X times to transmit data of the each row to X sequential rows in the display panel; and reading each row of the first part of the second subset of data sequentially from the first group of addresses to the line buffer to transmit data of the each row at a same time to a number of rows of pixels in the second region of the display panel without sharing common rows with the first region.

13. The display apparatus of claim 12, wherein the first set of image data comprises a set of original data for the display panel to display a frame of image with N×M pixels in a first resolution, wherein N and M are integers.

14. The display apparatus of claim 13, wherein the GPU is configured to receive the center coordinate and determine a high-definition region centered with the center coordinate having an area of L×L pixels in the first resolution, wherein L is an integer being a fraction of N and the fraction is in a range of ¼ to ⅓.

15. The display apparatus of claim 14, wherein the GPU is configured to render at least partially the first set of image data based on the center coordinate and the area of the high-definition region to obtain a first subset of data for L×L pixels in the first resolution, to compress the first set of image data by a compression factor to a set of compressed data, and to render the set of compressed data based on the boundary of the high-definition region to obtain a second subset of data for L×K pixels in the second resolution, wherein K is an integer being a fraction of M and the fraction is in a range of ¼ to ⅓, and the compression factor is substantially equal to the fraction.

16. The display apparatus of claim 15, wherein the IC is configured to receive a second set of image data including the first subset of data and the second subset of data to determine locations of a first region in a part of the display panel to be assigned with the first subset of data to display image in the first resolution and a second region in remaining part of the display panel beyond a boundary of the first subset of data.

17. The display apparatus of claim 12, wherein the IC is configured to transmit the second subset of data via the RAM to the display panel and scale up the second subset of data for L×K pixels to the N×M pixels, and to transmit the first subset of data to the L×L pixels of the first region to replace part of the second subset of data thereof, wherein the IC is configured to drive the display panel to display image in the first resolution in the first region using the first subset of data and display image in the second resolution in the second region using the scaled up second subset of data.

* * * * *